(12) United States Patent
Kato et al.

(10) Patent No.: US 10,260,491 B2
(45) Date of Patent: Apr. 16, 2019

(54) SLIDE MEMBER

(71) Applicant: TAIHO KOGYO Co., Ltd., Toyota-shi, Aichi (JP)

(72) Inventors: Masatomo Kato, Toyota (JP); Masato Shibata, Toyota (JP); Shingo Goto, Toyota (JP); Eiji Yoshida, Toyota (JP); Keigo Ota, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 55 days.

(21) Appl. No.: 14/766,207

(22) PCT Filed: Feb. 5, 2014

(86) PCT No.: PCT/JP2014/052686
§ 371 (c)(1),
(2) Date: Nov. 16, 2015

(87) PCT Pub. No.: WO2014/123159
PCT Pub. Date: Aug. 14, 2014

(65) Prior Publication Data
US 2016/0076528 A1 Mar. 17, 2016

(30) Foreign Application Priority Data
Feb. 6, 2013 (JP) .................................. 2013-021779

(51) Int. Cl.
*F04B 39/02* (2006.01)
*C10M 177/00* (2006.01)
(Continued)

(52) U.S. Cl.
CPC .............. *F04B 39/02* (2013.01); *C08G 73/14* (2013.01); *C08K 3/01* (2018.01); *C08K 3/04* (2013.01);
(Continued)

(58) Field of Classification Search
CPC .. F04B 39/02; F04B 27/1054; F04B 27/0886; F04B 27/086; F04B 27/0804;
(Continued)

(56) References Cited

U.S. PATENT DOCUMENTS 5,525,246 A * 6/1996 Kamiya ................ F16C 33/201
428/458
2003/0091746 A1 5/2003 Takahashi et al.
2013/0247699 A1* 9/2013 Nomura .............. F04B 27/1063
74/60

FOREIGN PATENT DOCUMENTS

EP 1454678 A1 9/2004
EP 1876352 A1 1/2008
(Continued)

OTHER PUBLICATIONS

Extended European Search Report corresponding to Application No. 14749634.3-1608/2955023, PCT/JP2014/052686; dated Oct. 11, 2016.
(Continued)

*Primary Examiner* — Taiwo Oladapo
(74) *Attorney, Agent, or Firm* — Cantor Colburn LLP

(57) ABSTRACT

Provided is a sliding member, method for manufacturing sliding member, and compressor swash plate using sliding member in which adhesion between the substrate and the resin is enhanced, and which has the excellent durability whereby peeling of the resin film from the substrate does not occur due to prolonged sliding even under harsh load conditions. The sliding member provides a substrate irradiated laser light with energy intensity per unit area of 0.053 J/mm² or more and configured an uneven part formed toward a vertical direction by the irradiated laser light and a melted and solidified portion on the uneven part and a resin film including solid lubricant and a binder resin on the substrate.

4 Claims, 6 Drawing Sheets

(51) Int. Cl.
*C10M 103/04* (2006.01)
*C10M 103/06* (2006.01)
*C10M 111/02* (2006.01)
*C10M 103/02* (2006.01)
*F04B 27/08* (2006.01)
*F16C 33/20* (2006.01)
*F04B 27/10* (2006.01)
*C09D 179/08* (2006.01)
*C09D 161/06* (2006.01)
*C09D 163/00* (2006.01)
*C08G 73/14* (2006.01)
*C08K 3/04* (2006.01)
*C08K 3/30* (2006.01)
*C08K 3/01* (2018.01)

(52) U.S. Cl.
CPC .............. *C08K 3/30* (2013.01); *C09D 161/06* (2013.01); *C09D 163/00* (2013.01); *C09D 179/08* (2013.01); *C10M 103/02* (2013.01); *C10M 103/04* (2013.01); *C10M 103/06* (2013.01); *C10M 111/02* (2013.01); *C10M 177/00* (2013.01); *F04B 27/0804* (2013.01); *F04B 27/086* (2013.01); *F04B 27/0886* (2013.01); *F04B 27/1054* (2013.01); *F16C 33/208* (2013.01); *C08K 2003/3009* (2013.01); *C10M 2201/041* (2013.01); *C10M 2201/0413* (2013.01); *C10M 2201/05* (2013.01); *C10M 2201/061* (2013.01); *C10M 2201/065* (2013.01); *C10M 2201/066* (2013.01); *C10M 2201/0663* (2013.01); *C10M 2217/0285* (2013.01); *C10M 2217/0443* (2013.01); *C10N 2230/06* (2013.01); *C10N 2240/02* (2013.01); *C10N 2250/08* (2013.01); *F05C 2253/12* (2013.01); *F05C 2253/20* (2013.01)

(58) Field of Classification Search
CPC .... C08G 73/14; C09D 161/06; C09D 163/00; C09D 179/08; F16C 33/208; C10M 103/02; C10M 103/06; C10M 103/04; C10M 111/02; C10M 177/00; C10M 2201/0413; C10M 2201/0663; C10M 2217/0443; C10M 2201/066; C10M 2201/065; C10M 2201/061; C10M 2201/05; C10M 2217/0285; C10M 2201/041; C08K 2003/3009; F05C 2253/20; F05C 2253/12; C10N 2230/06; C10N 2240/02; C10N 2250/08
See application file for complete search history.

(56) References Cited

FOREIGN PATENT DOCUMENTS

| JP | 60001384 A | * | 1/1985 | ............ F04B 27/086 |
|---|---|---|---|---|
| JP | S60001384 A | | 1/1985 | |
| JP | H0483914 A | | 3/1992 | |
| JP | H11106779 A | | 4/1999 | |
| JP | 2007192206 A | | 8/2007 | |
| JP | 2007289963 A | | 11/2007 | |
| JP | 2010133320 A | * | 6/2010 | |
| WO | 2012127759 A1 | | 9/2012 | |

OTHER PUBLICATIONS

International Search Report corresponding to Application No. PCT/JP2014/052686; dated May 13, 2014, with English translation.
Concise Explanation of the Relevance corresponding to U.S. Appl. No. 14/766,207.
*Macro-micro-mechanics and Strengthening and Toughening Design of Materials *Editors-in-chief: Kezhi Huang and Ziqiang Wang, published by the Tsinghua University Press in Jul. 2003 ; First edition; pp. 215-244; *Article: Rapid Fusion of Surface Layer of Alloy Caused by Pulse Laser and Its Influences on Microstructure and Mechanical Properties.).
Notification of Reexamination for CN201480007820.1, dated Apr. 26, 2018.

* cited by examiner

SLIDE MEMBER

CROSS REFERENCE TO RELATED APPLICATIONS

This is the U.S. national stage of application No. PCT/JP2014/52686, filed on Feb. 5, 2014. Priority under 35 U.S.C. § 119(a) and 35 U.S.C. § 365(b) is claimed from Japanese Application No. 2013-021779, filed Feb. 6, 2013, the disclosure of which is also incorporated herein by reference.

TECHNICAL FIELD

The present invention relates to a sliding member, a method for manufacturing sliding member, and a compressor swash plate using sliding member.

BACKGROUND ART

In a conventional sliding member, surfaces of a substrate are roughened by shot-blasting of aluminum, iron or cupper or by irradiating laser light to the substrate and resin is configured on the roughened substrate.

However, in a conventional sliding member, although a surface of a substrate is roughened by shot-blasting or irradiating laser light and resin is configured on the roughened substrate, the adhesion between the roughened substrate and the resin configured on the substrate is able to be not enough and the resin is peeled from the resin.

As the method for preventing the resin from peeling by irradiating laser light to the substrate and roughening the surface of the substrate, for example, it is described in the Patent Literature 1. In the method described in the Patent Literature 1 for preventing the resin from peeling by irradiating laser light to a base material and roughening the surface of the base material, the percentage of the irradiation of the laser light which irradiates the surface of the base material is not less than 44%, the surface of the base material is roughened, the resin is coated at the roughened surface of the base material, and peeling of the resin does not occur.

PRIOR ART REFERENCE

Patent Literature

Patent Literature 1: the Japanese Patent Publication No. 2007-289963

DISCLOSURE OF INVENTION

Problems to be Solved by the Invention

In the conventional method for roughening the base material by irradiating the laser to the surface of the base material, a hollow toward the vertical direction of the base material is able to be not enough, because the anchor effect between the base material and the resin coated at the base material is not achieved, the coated resin is able to be peeled from the base material, the adhesion between the base material and the resin is able to be not enough, and the durability to the adhesion between the base material and the resin is able to be not enough under harsh load conditions.

In consideration of the above problems, the present invention provides the sliding member, method for manufacturing the sliding member, and compressor swash plate using sliding member in which adhesion between the substrate and the resin is enhanced, and which has the excellent durability whereby peeling of the resin film from the substrate does not occur due to prolonged sliding even under harsh load conditions by irradiating the laser light in which the energy intensity per unit area is optimized to the substrate and by setting the hollow toward the vertical direction as the optimized depth for not peeling the resin film configured at the substrate.

Means for Solving the Problems

The sliding member according to an embodiment of this invention is characterized by providing a substrate irradiated laser light with energy intensity per unit area of 0.053 J/mm$^2$ or more and configured an uneven part formed toward a vertical direction by the irradiated laser light and a melted and solidified portion on the uneven part and a resin film including solid lubricant and a binder resin on the substrate.

The method for manufacturing slide member according to an embodiment of this invention is characterized by irradiating laser light with energy intensity per unit area of 0.053 J/mm$^2$ or more and configuring an uneven part formed toward a vertical direction on a substrate, configuring a melted and solidified portion on the uneven part of the substrate, and configuring a resin film including solid lubricant and a binder resin on the substrate.

Effect of the Invention

By irradiating laser light with optimized energy intensity per unit area to the substrate and by setting the hollow toward the vertical direction as the optimized depth for not peeling the resin film configured at the substrate, the present invention can provide the sliding member, method for manufacturing the sliding member, and compressor swash plate using sliding member in which adhesion between the substrate and the resin is enhanced, and which has the excellent durability whereby peeling of the resin film from the substrate does not occur due to prolonged sliding even under harsh load conditions.

DETAILED DESCRIPTION OF THE INVENTION

An embodiment of the invention is explained in detail with referring the drawings as below. Thus, this invention is not limited to the below embodiment.

Figure 1A:
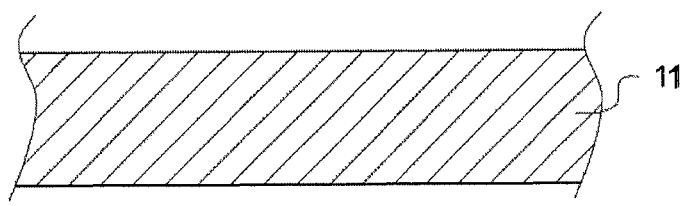
FIG. 1A to FIG. 1C are schematic cross section views of a method for manufacturing a slide member according to this embodiment.
Figure 1B:
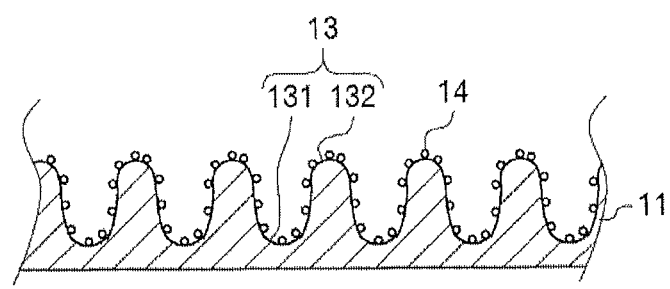
Figure 1C:
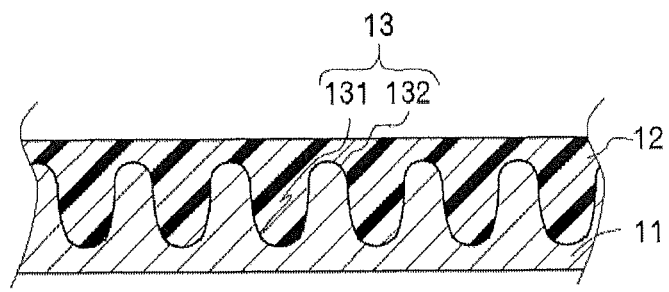

The FIGS. 1A to 1C are schematic cross section views of a method for manufacturing a slide member 10 according to this embodiment. As shown in the FIG. 1C, the slide member 10 according to this embodiment comprises the substrate 11 in which uneven parts 13 formed by the irradiated laser light and the resin film 12 configured on the substrate 11.

The method for manufacturing a slide member 10 according to this embodiment is explained as below. As shown in the FIG. 1A, firstly the substrate 11 is provided. The substrate 11 may be washed in order to remove impurities such as oils and fats and may be not washed because the laser light is irradiated on the whole surface of the substrate 11 in later steps. The material of the substrate 11 in which the laser light is irradiated is not limited especially and metallic material as iron-based material, aluminum-based material, or cupper-based material or complex material in which aluminum, cupper, and so on are fixed and jointed each other may be used as the material. The substrate 11 is not limited especially as a flat plate and may be a cylinder or a shape which has special curved surfaces. The thickness of the substrate 11 is preferably not less than 0.5 mm, by using the substrate 11 with this thickness, when the laser light is irradiated the substrate 11, the laser light does not pierce and the resin film 12 configured on the substrate 11 is easily configured without spaces.

Next, as shown in the FIG. 1B, by irradiating the laser light which has the optimized energy intensity per unit area to the substrate 11, for example, the uneven part 13 which is shaped as sine curve is configured. In the uneven part 13 which is shaped as sine curve, the hollow 131 is configured by irradiating the laser light to the substrate 11 constantly and a convexity 132 is configured by providing the unirradiated area which has optimized distance. The convexity 132 is configured by separating the laser light by the optimized distance so as to laminate the portion of the substrate 11 of the laser light when the laser light is irradiated. Described as below, the uneven part 13 is configured as the variety shaped uneven part 13 by changing the position of the laser light which is irradiated toward the substrate 11.

The laser light irradiated to the substrate 11 is explained. Laser machining with the laser light performs the fine machining precisely without contacting the tools and so on to workpieces. For example, the laser light irradiated to the substrate 11 may be selected from the YAG laser, semiconductor laser, liquid laser, or gas laser and using YAG laser is preferable in particular in them.

In the uneven part 13 of the substrate 11 according to the embodiment of this invention, by irradiating the laser light with optimized energy intensity per unit area to the substrate 11, the melted and solidified portion on the uneven part is configured. The portion 14 of the substrate configured on the uneven part 13 means the object by which the substrate 11 is melted, solidified and adhered and the object which is extended from the substrate 11 and solidified without adhering the substrate 11 by irradiating the laser light with optimized energy intensity per unit area to the substrate 11. The energy intensity per unit area of laser light is preferably the intensity for configuring the uneven part 13 which has depth described later on the substrate 11 toward a vertical direction and configuring the portion 14 of the substrate 11 on the uneven part 13. The energy intensity per unit area of laser light is preferably 0.053 J/mm$^2$ or more. If the energy intensity per unit area of laser light is less than 0.053 J/mm$^2$, the uneven part 13 is not configured on the substrate 11 and the portion 14 of the substrate is not configured on the uneven part 13 of the substrate 11. Laser light of the energy intensity per unit area of 0.053 J/mm$^2$ or more makes the uneven part 13 on the substrate 11 and the portion 14 of the substrate on the uneven part 13 of the substrate 11. The anchor effect is generated by entering the resin film 12 (described later) to the portion 14 of the substrate and the adhesion between the substrate 11 and the resin film 12 is enhanced. Thus, In the FIG. 1 to the FIG. 3, the portion 14 of the substrate is shown as beads and the shape of the portion 14 of the substrate may be limited to the beads.

The depth of hollows 131 of the uneven part 13 which is configured by irradiating the laser light with energy intensity per unit area of 0.053 J/mm$^2$ or more to the whole surface of the substrate 11 are preferably 45 μm or less toward the vertical direction of the substrate 11. If the depth of the substrate 11 toward the vertical direction is more than 45 μm, the resin film is not filled up on the whole surface of the uneven part 13 of the substrate 11. The anchor effect to the resin film 12 by the portion 14 of the substrate is not generated and the adhesion is decreased.

The laser light is irradiated constantly so as to overlap about one-fourth of the spot diameter of the laser light when the hollows 131 of the uneven part 13 are configured. By irradiating the laser light so as to overlap the spot diameter of the laser light, the hollows 131 of the uneven part 13 and the portion 14 of the substrate which is configured on the uneven part 13 is controlled. For example, the convexity 132 of the uneven part 13 is configured that the area unirradiated by laser light is separated from the center of the spot diameter of the laser light by 1 μm to 80 μm. By setting the area unirradiated by laser light as 1 μm to 80 μm, the uneven part 13 which is configured on the substrate 11 and the portion 14 of the substrate which is configured on the substrate 11 is controlled, and the adhesion between the substrate 11 and the resin film 12 is enhanced. Thus, unless the adhesion between the substrate 11 and the resin film 12 is decreased, the area unirradiated by laser light is not provided and the laser light is irradiated in such a way as to overlap the laser light.

Figure 2A:
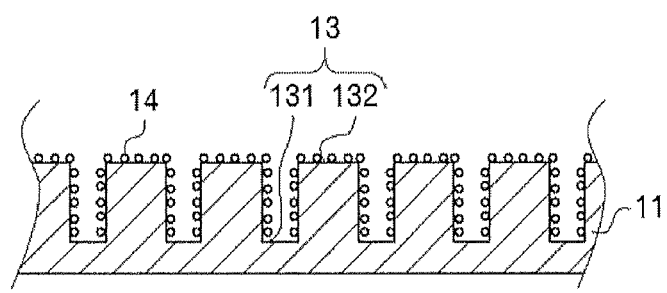
FIG. 2A and FIG. 2B are schematic cross section views of a shape of a substrate in the FIG. 1B toward the vertical direction.
Figure 2B:
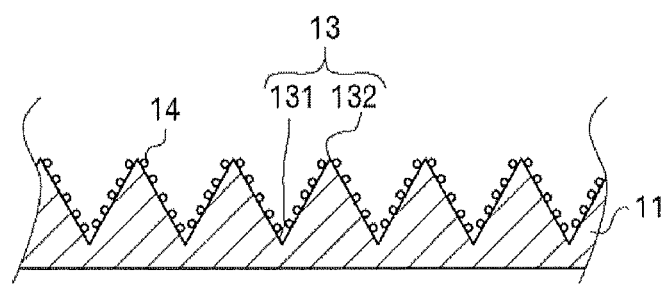
Figure 3A:
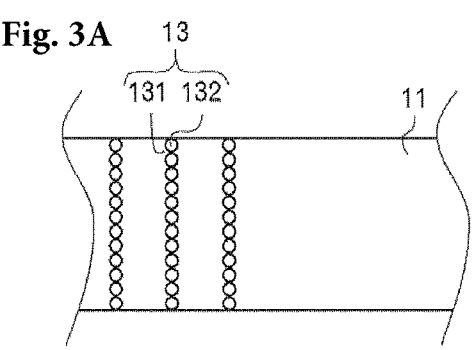
FIG. 3A to FIG. 3D are schematic plan views of an uneven shape of a substrate in the FIG. 1B.
Figure 3C:
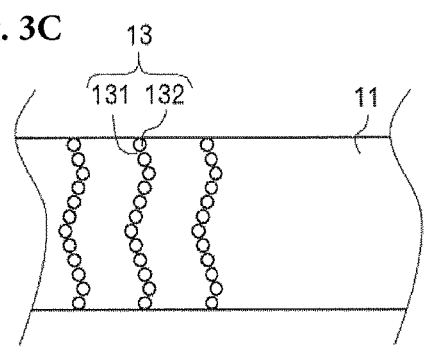
Figure 3B:
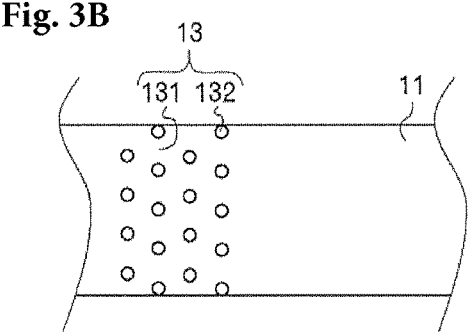
Figure 3D:
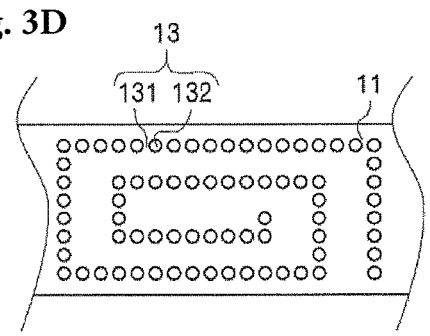
Figure 4:
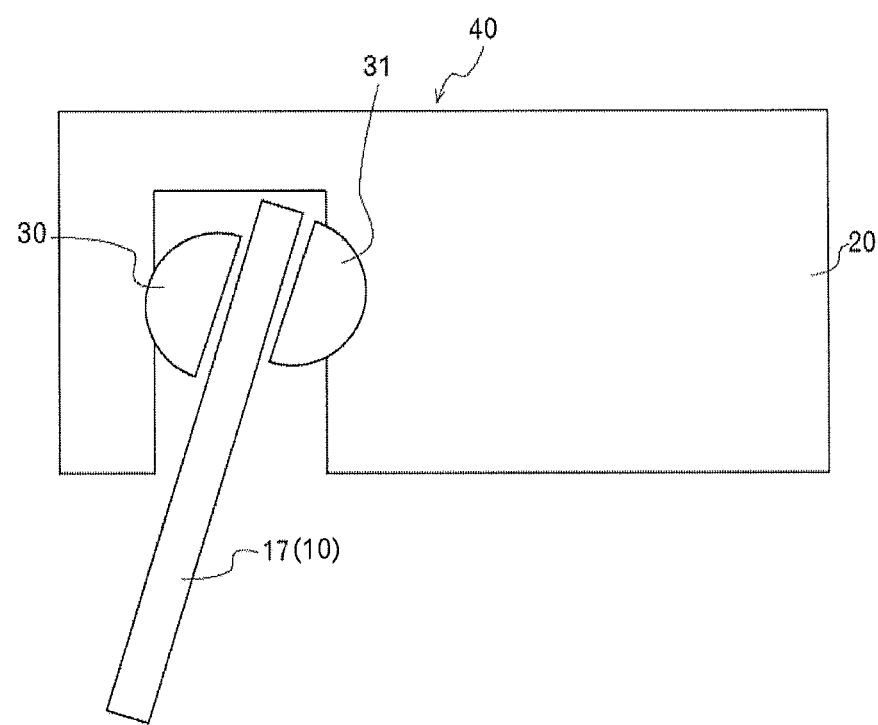
FIG. 4 is a schematic cross section view of a compressor swash plate using sliding member according to this embodiment.

The shape of the uneven part 13 toward the vertical direction configured by irradiating the laser light which has the optimized energy intensity per unit area to the substrate 11 is explained. The FIG. 2A and the FIG. 2B are the schematic cross section views of the other shape of the uneven part 13 of the substrate 11 in the FIG. 1B toward the vertical direction. As shown in the FIG. 2A, the uneven part 13 of the substrate 11 may be configured as the square wave shape. As shown in the FIG. 2B, the uneven part 13 of the substrate 11 may be configured as the saw tooth wave shape. The shapes of the uneven part 13 of the substrate 11 are able to configured as the optimized shape by controlling the laser light which has the optimized energy intensity per unit area, and these shapes are not limited if the resin film is filled up on the whole surface of the substrate 11 when the resin film 12 is configured on the substrate 11 which provides the uneven part 13.

The portion 14 of the substrate adhered on the uneven part 13 of the substrate 11 by irradiating the laser light with energy intensity per unit area of 0.053 J/mm$^2$ or more is preferably a heterogeneous shape containing beads, rectangular parallelepipeds, or rhombuses. By the portion 14 of the substrate which provides the heterogeneous shape containing beads, rectangular parallelepipeds, or rhombuses, the resin film configured on the substrate 11 is entered to the portion 14 of the substrate configured on the uneven part 13 of this substrate 11 and the anchor effect is generated and the sufficient adhesion is generated under harsh load conditions. About the portion 14 of the substrate configured on the uneven part 13 of this substrate 11, the size and numbers of the portion 14 of the substrate are controlled by the laser light with energy intensity per unit area of 0.053 J/mm² or more. The size of the portion 14 of the substrate is 15 µm or less and the numbers of the portion 14 of the substrate per unit area is 75 units/mm². If they become out of the range, the anchor effect is not generated and the adhesion between the substrate 11 and the resin film 12 is decreased.

The FIGS. 3A to 3D are schematic plan views of an uneven part 13 in the FIG. 1B.

As shown in the FIGS. 3A to 3D, the type of the irradiation of the laser light is not limited if the uneven part 13 is configured on the substrate 11. The shape of the uneven part 13 may be stripe shape as shown in the FIG. 3A, alternate shape as shown in the FIG. 3B, or wave shape as shown in the FIG. 3C, or spiral shape as shown in the FIG. 3D. The shape of the uneven part 13 configured by irradiating laser light is not limited if the adhesion to the resin film 13 is kept.

Next, as shown in the FIG. 1C, the resin film 12 is configured on the substrate 11 in which uneven part 13 is configured. The resin film 12 is the film including solid lubricant and a binder resin. The solid lubricant according to the embodiment of this invention is not limited and for example the solid lubricant is selected from any one of molybdenum disulfide ($MoS_2$), graphite, h-BN, tungsten disulfide ($WS_2$), Pb, or CF and so on. These solid lubricants have the function for lowering and stabilizing the coefficient of friction and for preventing the seizure. For achieving the sufficient effect of the function, the average particle size of the solid lubricants is preferably 15 µm or less and especially preferably from 0.2 µm to 10 µm.

The solid lubricants may be used by mixing one or plural material. These solid lubricants have the function for lowering and stabilizing the coefficient of friction and for preventing the seizure. The contents of the solid lubricants contained in the material of the resin film 12 are preferably from 10% by mass to 80% by mass and further preferably from 40% by mass to 60%. By the contents fallen in these range, the film of the solid lubricants is configured as the film which has the excellent frictional property and wear and abrasion resistance.

The binder resin is not limited and preferably the resin which has high heat resistance, for example, polyamide imide; polyimide, epoxy resin, phenol resin, polyamide (nylon), fluororesin (PTFE, FEP and so on), or elastomer and so on. These binder resin has the function for keeping the solid lubricants and getting the wear and abrasion resistance. The contents of the binder resin contained in the resin film 12 are preferably from 10% by mass to 80% by mass. The property for holding the solid lubricants and the wear and abrasion resistance are obtained by the contents fallen in these range, The material of the resin film 12 may include addition agent other than the above. For example, the addition agent is solid particle as $Al_2O_3$, $Si_2N_4$, $TiO_2$ or $SiO_2$ and so on or extreme pressure agent.

The method for configuring the resin film 12 on the surface of the substrate 11 is not limited. For example, after the material of the resin film 12 is mixed to the surface of the substrate 11 including the uneven part 13 and soaked by spray, the resin film may be configured by drying and firing by 150 degrees Celsius or more and 300 degrees Celsius or less. A tumbling method, a dipping method, a brush painting method, or roll shaped method and so on is used other than the spray soaking method (for example air spray or air electrostatic coating). The thickness of the resin film 12 is 1 µm or more and 50 µm or less.

The resin film 12 configured on the substrate may provide some holes which is the oil sump opened at the sliding surface. The shape of the open face of the hole is not limited and may be shaped as circle shape, elliptical shape, or polygon shape. This hole may be configured by YAG laser described above. The depth of the hole is preferably 5 µm or more and 40 µm or less. The spillage of lubricating oil and so on is prevented and the lubricating oil and foreign bodies by the depth in this range. The depth of this hole is preferably less than the thickness of the resin film 12. It is not necessary that the hole is configured at the whole sliding surface and the specific position where the load is added on sliding.

In the resin film 12 configured on the substrate 11, a convexity may be shaped adjacent to the grooves so as to increase the initial conformability and to obtain the excellent sliding property under harsh load conditions. In this case, a convexity may be shaped adjacent to the grooves and the cross-sectional shape of the groove is not limited if the lubricating oil is kept. The cross-sectional shape of the groove is for example semi-circle shape, triangle shape, or trapezoid shape and so on. The cross-sectional shape of the groove is preferably semi-circle shape or triangle shape because the formation rates of the convexity is high and the initial contact pressure is high and the deformation and the wear are caused easily and the initial conformability is achieved satisfactorily. Especially, the cross-sectional shape of the groove is preferably semi-circle shape to keep much lubricating oil.

The depth and the pitch of the circumferential groove is not limited and suitably set by the shape, size and the necessary sliding property. The depth of the circumferential groove is usually 1 µm-20 µm and preferably 1 µm-7 µm. The pitch of the circumferential groove is usually 0.05 µm-1 mm and preferably 0.1 µm-0.5 mm. In the sliding surface, it is not necessary that the depth and the pitch of the all circumferential grooves are same length, the depth and the pitch of the circumferential groove may be changed randomly on the sliding surface according to the peripheral speed difference and the sliding property and so on.

Next, the example with the sliding member 10 according to the embodiment of this invention as the swash plate 17 for the compressor 40. The FIG. 5 is the schematic cross section view of the compressor 40 using sliding member 10 as the swash plate according to the practical example of the invention. As shown in the FIG. 5, the compressor 40 using sliding member 10 as the swash plate provides the swash plate 17 as the sliding member 10 provided at the outer circumference of the axle slantingly, the cut-out portion at the edge to cover the outer circumference of the swash plate 17 and to be disposed along the axle, piston 20 which has the couple of the semi-circle hollow configured in the cut-out portion at the edge, and the couple of the semi-circle shoe 30, 31 disposed at the couple of the semi-circle hollow of the piston 20.

The sliding member 10 according to the embodiment of this invention is able to prevent the resin film 12 from peeling from the substrate in spite of under the harsh load conditions, for example, under the poor lubricity or under the no lubricity in case that lubrication oil adhered on the sliding member 10 is flew out by flowing gas. When the lubrication oil is not supplied to the surface in the initial stage of the drive, the lubrication oil which is kept in the hole as an oil sump is oozed and the occasion of contact between solids are decreased and the seize resistance is increased.

According to the sliding member 10 according to the embodiment of this invention, the adhesion between the substrate 11 and resin film 12 is sufficiently kept and the initial conformability and the wear and abrasion resistance is achieved.

The sliding member 10 according to the embodiment of this invention is used as the swash plate 17 for the compressor 40 explained above. The above laser light is used when the substrate 11 is not only metallic material as iron-based material, aluminum-based material, or cupper-based material but the material which is necessary to increase the adhesion. For example, the sliding member 10 is used for the piston or the shoe 30, 31.

The example of this invention is explained in detail. Firstly, referring to the FIGS. 1A to 1C, the sliding member 10 according to the example of this invention is explained, and the compressor swash plate using the sliding member 10 is explained.

Example 1

The slide member 10 according to this example 1, as shown in the FIG. 1A, the iron-based substrate 11 which has the 6 mm thickness is provided, polished and cleaned for removing the impurities such as oils and fats.

Next, as shown in the FIG. 1B, the laser light with energy intensity per unit area of 0.05 J/mm$^2$ is irradiated constantly and the hollows 131 of depth of 2 μm are configured toward the vertical direction of the substrate 11. The distance from the center of the spot of the laser light to the corner of the convexity 132 unirradiated by laser light is 60 μm. The area unirradiated by laser light is configured focusing on the corner of the convexity 132 and the uneven part 13 is configured on the substrate 11 and the portion 14 of the substrate is configured on the uneven part 13. The laser light irradiated to the substrate 11 according to example is YAG laser light.

Figure 5A:
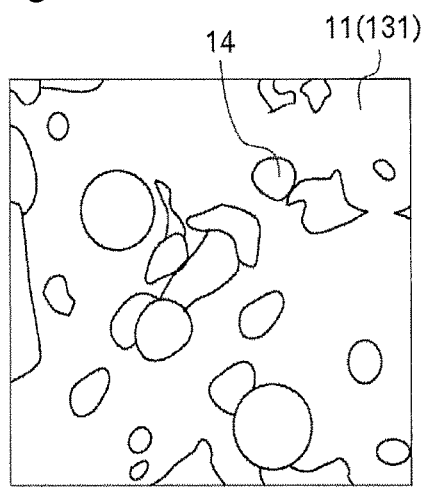
FIGS. 5A and 5B are schematic cross section view of a compressor swash plate using sliding member according to the practical example 1 of the invention.
Figure 5B:
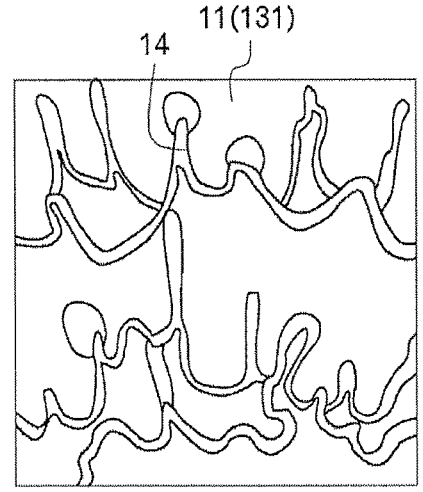

The uneven part 13 configured on the substrate 11 and the portion 14 of the substrate configured on the uneven part 13 are explained. The FIG. 5A is the schematic view of surface of the portion 14 of a substrate configured on a uneven part 13 of the substrate 11 according to the example 1 and the FIG. 5B is the schematic view of surface of portion 14 of a substrate configured on a uneven part 13 of the substrate 11 according to the example 1. As shown in the FIG. 5A and the FIG. 5B, the portion 14 of a substrate configured on a uneven part 13 of the substrate 11 is adhered on the hollows 131 of the substrate 11 by irradiating the laser light with energy intensity per unit area of 0.05 J/mm$^2$ and the objects like the splash on the hollows 131 of the substrate 11 are solidified. Thus, the portion 14 of a substrate of 75 units/mm$^2$ is configured. This result is shown in the Table 1.

Nest, as shown in the FIG. 1C, the resin film 12 is configured on the substrate 11 on which configure the uneven part 13. The material is provided as the resin film 12 contains 25% by mass molybdenum disulfide, 30% by mass graphite, and remains polyamide imide. The N-methyl-2-pyrrolidone as the solvent of the resin is added to the material and by the roll printing method the resin film of thickness of 60 μm is configured by adhering the resin on the substrate 11 of the uneven part 13 contained the portion 14 of the substrate. Later, the firing by 220 degrees Celsius at a holding time of 1 hour is performed and next the cutting by using lathe which has the diamonds tip of the nose radius of 0.8 is performed by the feeding speed of the 0.16 mm and the circumferential groove of the pitch of 0.16 mm and the depth of 4 μm is configured. By the method, sliding member 10 according to the example 1 is configured.

Example 2

The slide member 10 according to this example 2 is configured by the same method as the example 1 except that the laser light with energy intensity per unit area of 0.10 J/mm$^2$ is irradiated. In the sliding member, the depth of the uneven part 13 toward the vertical direction is 5 μm and the portion 14 of the substrate per unit area is 100 units/mm$^2$ is configured. This result is shown in the Table 1.

Example 3

The slide member 10 according to this example 3 is configured by the same method as the example 1 except that the laser light with energy intensity per unit area of 0.24 J/mm$^2$ is irradiated. In the sliding member, the depth of the uneven part 13 toward the vertical direction is 10 μm and the portion 14 of the substrate per unit area is 7000 units/mm$^2$ is configured. This result is shown in the Table 1.

Example 4

The slide member 10 according to this example 4 is configured by the same method as the example 1 except that the laser light with energy intensity per unit area of 0.34 J/mm$^2$ is irradiated. In the sliding member, the depth of the uneven part 13 toward the vertical direction is 15 μm and the portion 14 of the substrate per unit area is 8000 units/mm$^2$ is configured. This result is shown in the Table 1.

Comparative Example 1

Figure 6:
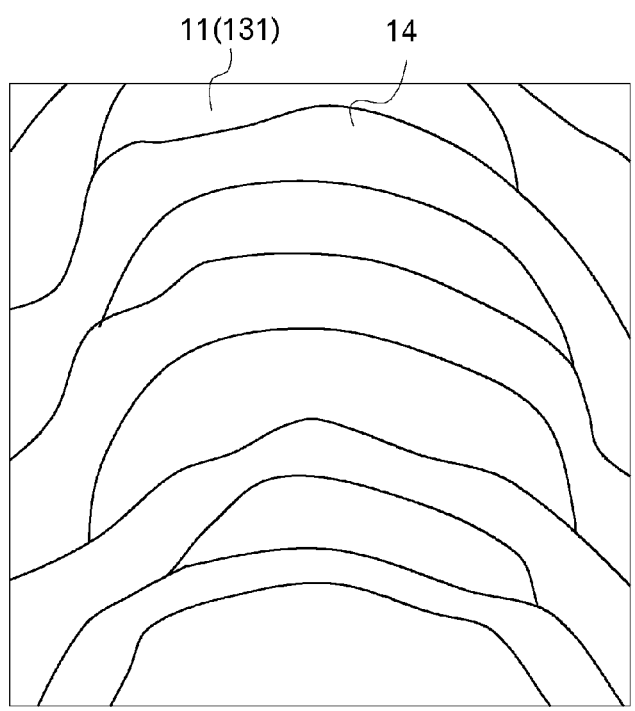
FIG. 6 is a schematic view of surface of portion of a substrate configured on a uneven part of the substrate according to the compared example 1.

The slide member 10 is configured by the same method as the example 1 except that the laser light with energy intensity per unit area of 0.04 J/mm$^2$ is irradiated. The FIG. 6 is the schematic view of surface of the portion 14 of a substrate configured on a uneven part 13 of the substrate 11 according to the comparative example 1. As shown in the FIG. 6, in the portion 14 of a substrate on a uneven part 13 of the substrate 11, the objects like the splash on the hollows 131 of the substrate 11 are solidified by irradiating the laser light with energy intensity per unit area of 0.04 J/mm$^2$. In the sliding member 10, the depth of the uneven part 13 toward the vertical direction is 1 μm and the portion 14 of the substrate per unit area is 0 units/mm$^2$ is configured. This result is shown in the Table 1.

TABLE 1

| | The energy intensity per unit area (J/mm$^2$) | The depth of a concave portion (μm) | The number of parts of material per unit area (/mm$^2$) |
|---|---|---|---|
| operation 1 | 0.05 | 2 | 75 |
| operation 2 | 0.10 | 5 | 100 |
| operation 3 | 0.24 | 10 | 7000 |
| operation 4 | 0.34 | 15 | 8000 |
| example 1 | 0.04 | 1 | 0 |

Under the below condition, the peeling test and the abrasion test in which the slide member 10 according to embodiments 1 to 4 and the comparative example 1 are used as the compressor swash plate is performed. This result is shown in the Table 2.

Test form: 3 shoes/flat plate
Engine speed: 7200 rpm

Load: 1735 N
Lubrication: refrigerant/coolant oil mixed, atmosphere inducted by compressor
Opposite material: shoe (firing SUJ2)

TABLE 2

|  | The seizure Load [N] | The coefficient of friction | The abrasion wear [μm] | Remarks |
|---|---|---|---|---|
| operation 1 | 1735 or more than 1735 | 0.007 | 3 μm | No avulsion of resin layer |
| operation 2 | 1735 or more than 1735 | 0.006 | 1 μm | No avulsion of resin layer |
| operation 3 | 1735 or more than 1735 | 0.005 | 2 μm | No avulsion of resin layer |
| operation 4 | 1735 or more than 1735 | 0.006 | 2 μm | No avulsion of resin layer |
| example 1 | 1183 | 0.012 | 20 (avulsion part) | Avulsion of resin layer |

As shown in the Table 2, According to this embodiment 1 to this embodiment 4, the portion 14 of a substrate is configured on the uneven part 13 of the substrate 11 by controlling the laser light with energy intensity per unit area. The adhesion is enhanced and the initial conformability is enhanced and the excellent frictional property and excellent wear and abrasion resistance are achieved. In the other hand, the adhesion is not achieved and the peeling of the resin film is generated.

INDUSTRIAL APPLICABILITY

The present invention is acceptable to the skill of a sliding member, a method for manufacturing sliding member, and a compressor swash plate using sliding member.

The invention claimed is:

1. A slide member comprising:
a substrate having an uneven surface comprising a plurality of convexities;
a plurality of solidified molten portions provided on the uneven surface; and
a resin film comprising solid lubricant and a binder resin, the resin film being provided on the substrate;
wherein each of the plurality of solidified molten portions is formed in a shape of a parallelepiped;
wherein a length of the solidified molten portion is 15 μm or less and a number of the solidified molten portion per unit area is approximately 75 units/mm$^2$.

2. The slide member according to claim 1,
wherein a height of the convexities is 45 μm or less.

3. The slide member according to claim 1,
wherein the solid lubricant is selected from any one of molybdenum disulfide ($MoS_2$), graphite, h-BN, tungsten disulfide ($WS_2$), Pb, or CF.

4. The slide member according to claim 2,
wherein the solid lubricant is selected from any one of molybdenum disulfide ($MoS_2$), graphite, h-BN, tungsten disulfide ($WS_2$), Pb, or CF.

* * * * *